(12) United States Patent
Bhatia et al.

(10) Patent No.: US 10,977,310 B2
(45) Date of Patent: *Apr. 13, 2021

(54) NEURAL BIT EMBEDDINGS FOR GRAPHS

(71) Applicant: International Business Machines Corporation, Armonk, NY (US)

(72) Inventors: Sumit Bhatia, New Delhi (IN); Vinith Misra, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 196 days.

This patent is subject to a terminal disclaimer.

(21) Appl. No.: 15/793,539

(22) Filed: Oct. 25, 2017

(65) Prior Publication Data

US 2018/0341720 A1    Nov. 29, 2018

Related U.S. Application Data

(63) Continuation of application No. 15/603,977, filed on May 24, 2017.

(51) Int. Cl.
| | | |
|---|---|---|
| *G06F 16/00* | (2019.01) | |
| *G06F 16/901* | (2019.01) | |
| *G06F 16/248* | (2019.01) | |
| *G06F 17/10* | (2006.01) | |
| *G06N 5/00* | (2006.01) | |
| *G06N 5/02* | (2006.01) | |
| *G06F 16/2455* | (2019.01) | |

(52) U.S. Cl.
CPC ........ *G06F 16/9024* (2019.01); *G06F 16/248* (2019.01); *G06F 16/2455* (2019.01); *G06F 17/10* (2013.01); *G06N 5/003* (2013.01); *G06N 5/022* (2013.01)

(58) Field of Classification Search
CPC ............ G06F 16/9024; G06F 16/2455; G06F 16/248; G06F 17/10; G06N 5/02
See application file for complete search history.

(56) References Cited

U.S. PATENT DOCUMENTS

| | | | |
|---|---|---|---|
| 8,165,414 B1 * | 4/2012 | Yagnik | .................... G06F 16/41 |
| | | | 382/255 |
| 8,370,338 B2 | 2/2013 | Gordo et al. | |
| 2002/0018448 A1 * | 2/2002 | Amis | ................ H04L 29/12254 |
| | | | 370/255 |

(Continued)

OTHER PUBLICATIONS

Google Search (Year: 2010).*

(Continued)

*Primary Examiner* — Mark D Featherstone
*Assistant Examiner* — Kweku William Halm
(74) *Attorney, Agent, or Firm* — VanLeeuwen & Vanleeuwen; Feb R. Cabrasawan (57) ABSTRACT

An approach is provided in which a system transforms a set of embedding approximation values corresponding to a set of knowledge graph nodes into a set of binary valued embedding vectors. The system evaluates the set of binary valued embedding vectors against a query and a selects one of the binary valued embedding vectors based on the evaluation. The system then identifies one of the knowledge graph nodes that corresponds to the selected binary valued embedding vector and in turn, provides a result to the query based on the identified knowledge graph node.

5 Claims, 6 Drawing Sheets

(56) References Cited

U.S. PATENT DOCUMENTS

| | | | | |
|---|---|---|---|---|
| 2011/0035374 | A1* | 2/2011 | Vadrevu | G06F 16/951 707/728 |
| 2012/0143853 | A1* | 6/2012 | Gordo | G06F 16/583 707/723 |
| 2013/0114811 | A1 | 5/2013 | Boufounos et al. | |
| 2013/0336588 | A1 | 12/2013 | Rane et al. | |
| 2014/0279727 | A1* | 9/2014 | Baraniuk | G09B 7/00 706/11 |
| 2017/0011091 | A1* | 1/2017 | Chehreghani | G06F 16/22 |
| 2018/0101742 | A1* | 4/2018 | Burge | G06K 9/00926 |
| 2018/0107682 | A1* | 4/2018 | Wang | G06F 16/583 |
| 2018/0181855 | A1* | 6/2018 | Johnson, Jr. | G06N 3/006 |
| 2018/0232443 | A1* | 8/2018 | Delgo | G06F 17/278 |
| 2018/0253496 | A1* | 9/2018 | Natchu | G06F 16/951 |
| 2018/0276540 | A1 | 9/2018 | Xing | |

OTHER PUBLICATIONS

Yoon, "Reachability Vectors: Features for Link-Based Similarity Measures" p. 594-597 (Year: 2014).*

Krishnamurthy et al., "CrossBridge: Finding Analogies Using Dimensionality Reduction," Association for the Advancement of Artificial Intelligence (www.aaai.org), 2010, 6 pages.

Liben-Nowell et al., "Structural Properties and Tractability Results for Linear Synteny," Journal of Discrete Algorithms 2(2):207-228—Aug. 2000, 16 pages.

Nickel et al., "A Three-Way Model for Collective Learning on Multi-Relational Data," Proceedings of the 28th International Conference on Machine Learning, Bellevue, WA, Jun. 2011, 8 pages.

Salakhutdinov et al., "Semantic hashing," International Journal of Approximate Reasoning 50, 2009, pp. 969-978.

"List of IBM Patents or Patent Applications Treated as Related," Letter from Leslie A. Van Leeuwen, Oct. 25, 2017, 1 page.

Bhatia et al., "Neural Bit Embeddings for Graphs," U.S. Appl. No. 15/603,977, filed May 24, 2017, 30 pages.

* cited by examiner

NEURAL BIT EMBEDDINGS FOR GRAPHS

BACKGROUND

Knowledge Graphs are emerging as a popular and useful way to represent and leverage codified information for a variety of use cases. Knowledge graphs may be used in cognitive computing to build large knowledge bases of structured collections of facts about the world that computer systems use to reason and to interact with humans more naturally. For example, codifying key concepts and relationships of a particular domain may greatly accelerate a variety of tasks from providing semantic and natural language search over more traditional business intelligence data, to providing enabling query expansion and matching, to discovery and exploration of related concepts and relations extracted from a large corpus of unstructured documents.

Knowledge graphs include nodes (entities) and edges that connect the nodes. For larger knowledge graphs, or for knowledge graphs with noisy edges, algorithmically aiding a user in accurate information retrieval is necessary to process a query, such as by identifying the most important edges, predicting links that do not exist, etc. While accuracy is important, the responsiveness of the information retrieval is critical to support real-time time data analysis.

BRIEF SUMMARY

According to one embodiment of the present disclosure, an approach is provided in which a system transforms a set of embedding approximation values corresponding to a set of knowledge graph nodes into a set of binary valued embedding vectors. The system evaluates the set of binary valued embedding vectors against a query and a selects one of the binary valued embedding vectors based on the evaluation. The system then identifies one of the knowledge graph nodes that corresponds to the selected binary valued embedding vector and in turn, provides a result to the query based on the identified knowledge graph node.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

Figure 1:
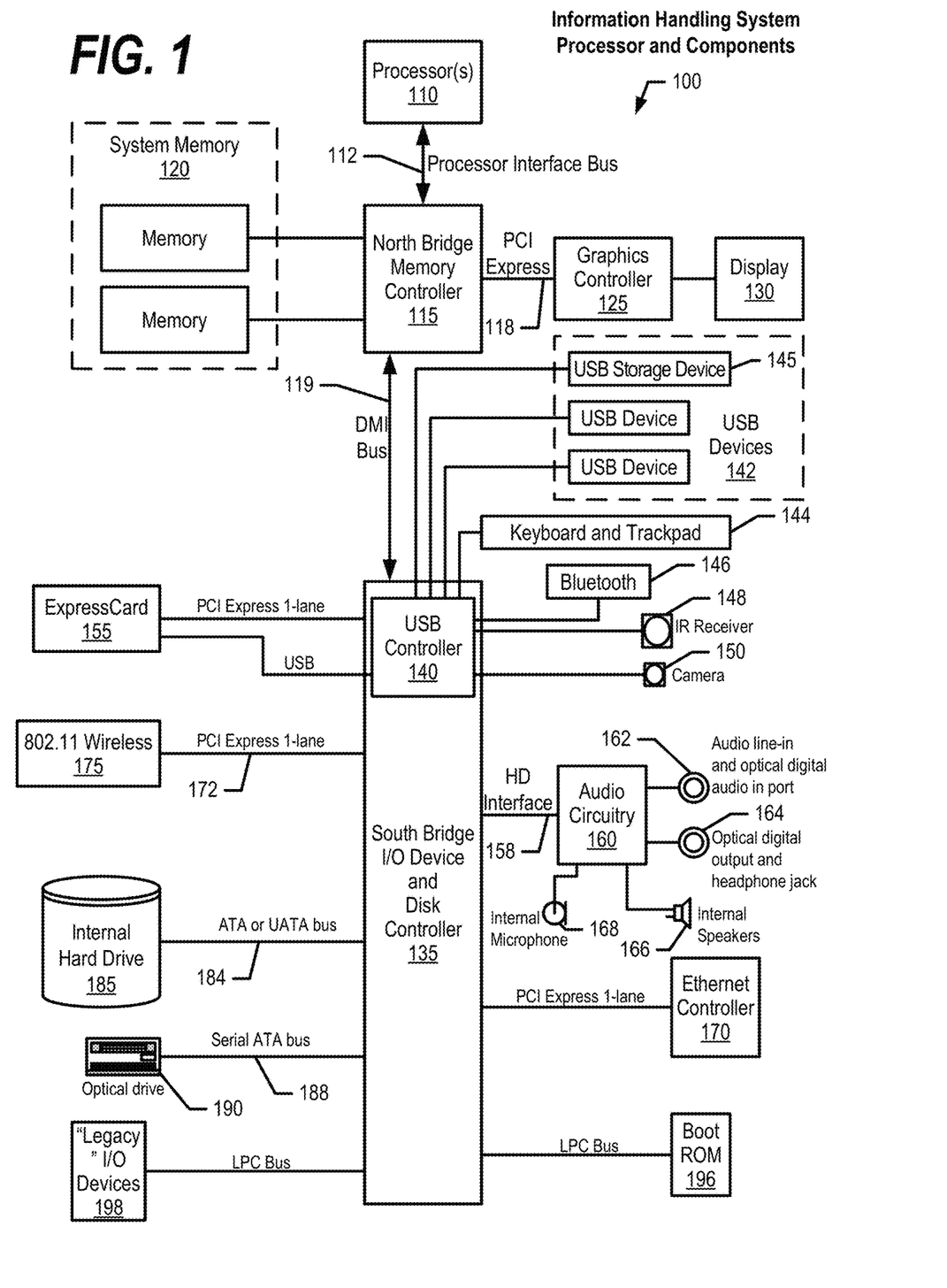
FIG. 1 is a block diagram of a data processing system in which the methods described herein can be implemented.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
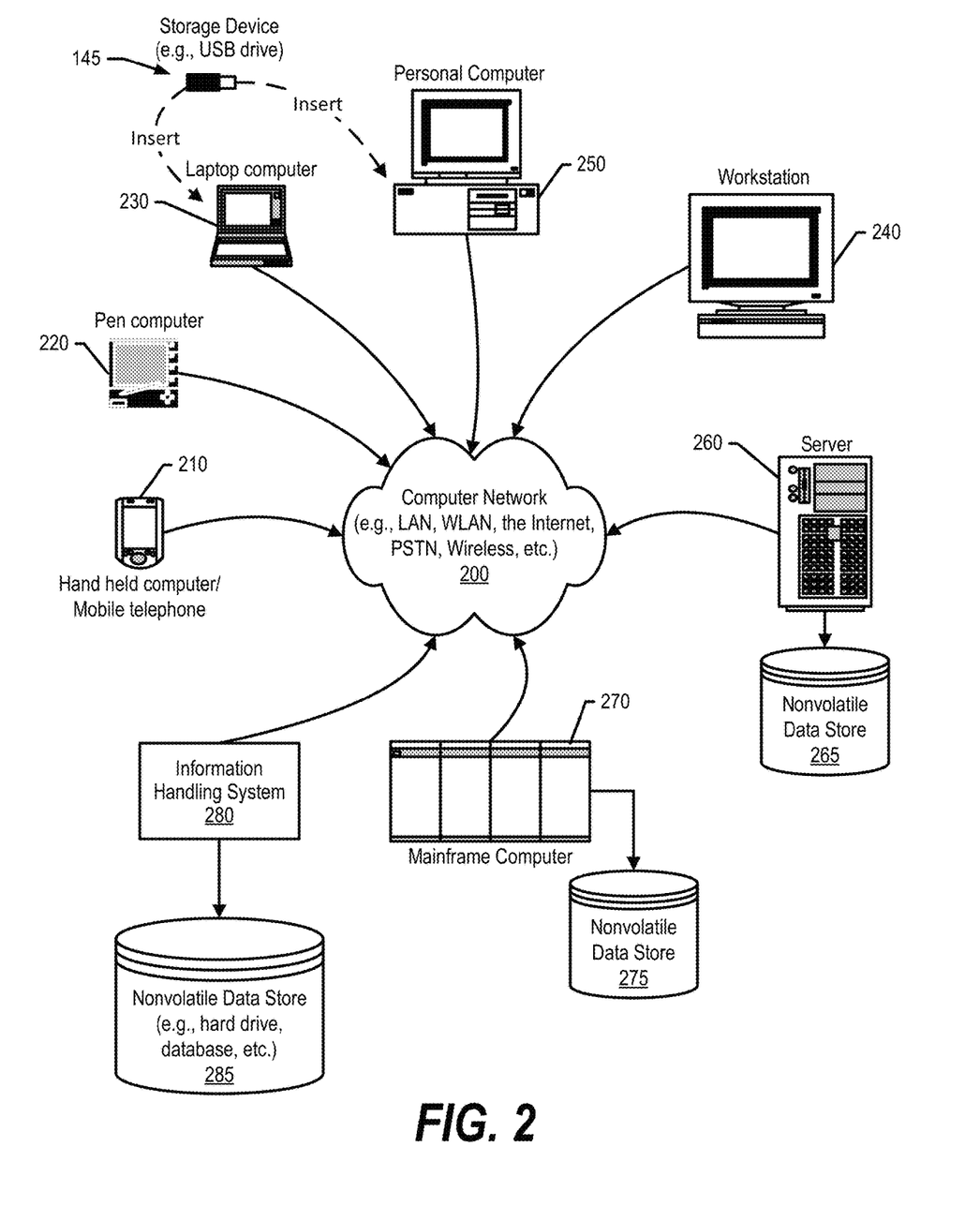
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Today's traditional graph-based algorithms may use observable graph features to evaluate similarities between two nodes by computing a series of directly observable "features" that describe their relatedness (e.g., number of common neighbors, etc.), which requires a substantial amount of time and processing resources. Latent factor model algorithms may also be used to analyze knowledge graphs. Latent factor models for graphs use machine learning to learn a set of floating point numbers that describe each node instead of computing a set of features (feature sets) to characterize the similarity between two nodes. The latent factor models for graphs approach then evaluates two nodes' similarity to one another and determines their closeness of their sets of numbers. While floating-point latent factors can provide tremendous value to graph analysis, operations in a space of floating point numbers (e.g. finding nearest neighbors) can be very slow.

Semantic hashing is a form of retrieving similar datapoints (and more broadly, evaluating similarity between data points) to compare certain types of dense data, such as images, text, etc. In semantic hashing, each document or image is reduced to a set of features using deep learning techniques. To avoid a nearest neighbor search, however, these features are designed to be binary-valued instead of real-valued. Semantic hashing as it is designed, however, does not work with large sparse data, such as the data contained in most large graphs of interest today, where a fraction of the possible edges between nodes actually exist.

FIGS. 3 through 6 depict an approach of creating neural bit embeddings for knowledge graph nodes to quickly provide information for user queries corresponding to the knowledge graph nodes. The approach described herein uses a direct end-to-end approach to learn binary-valued features for large sparse graphs and, rather than separating the learning of a real embedding and the learning of its quantization, the embeddings are explicitly optimized for their eventual quantization and use in link prediction/node retrieval. By characterizing the embeddings as independent decisions of varying bias, continuous optimization techniques are applied to an approximate expected loss. Embeddings optimized in this fashion outperform the quantization of both spectral graph embeddings and various learned real-valued embeddings on both ranking and pre-ranking tasks for a variety of datasets.

Figure 3:
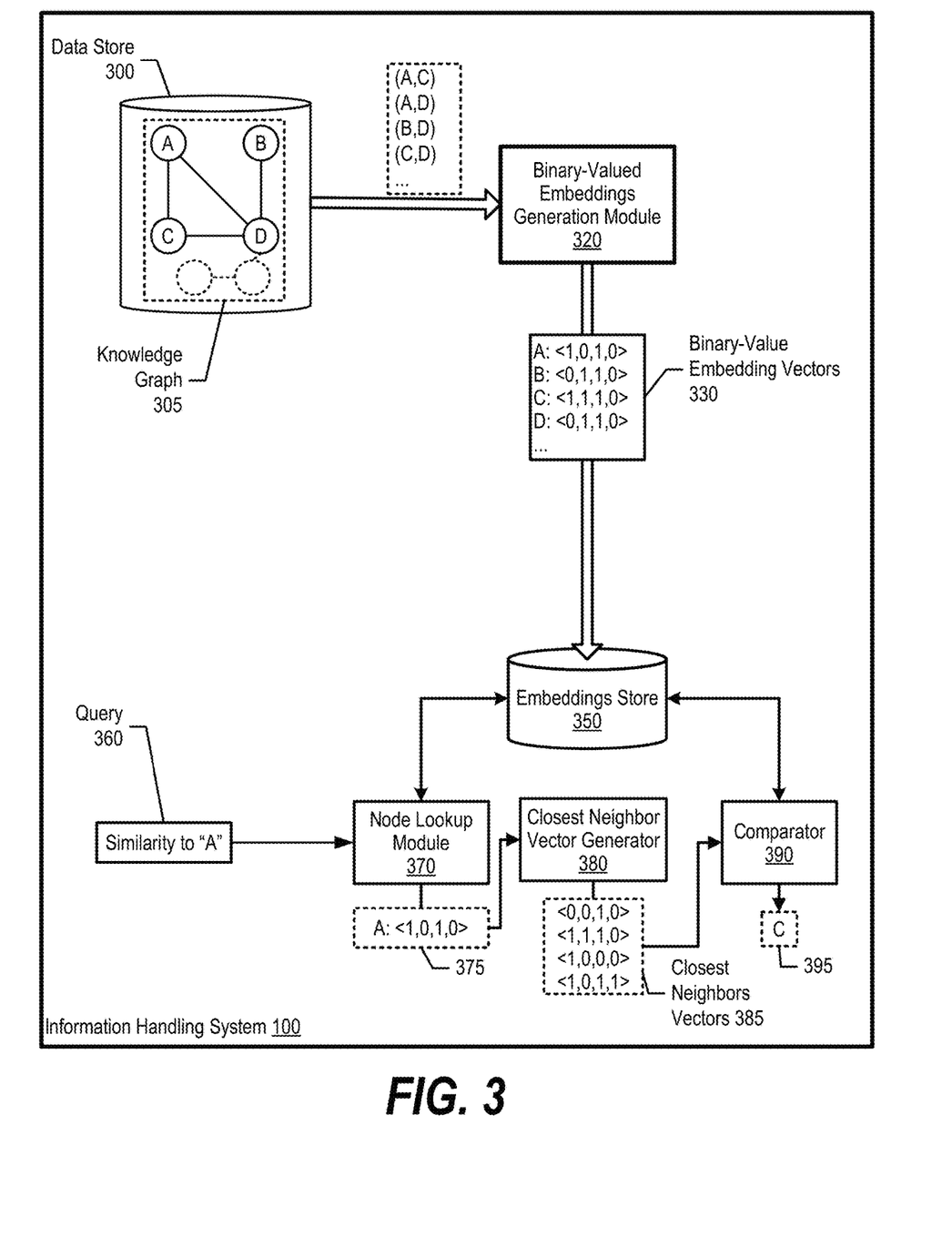
FIG. 3 is a high-level diagram depicting an example of a system transforming knowledge graph information into binary-valued embedding vectors and using the binary-valued embedding vectors to efficiently provide information during a question answer session.

FIG. 3 is a high-level diagram depicting an example of a system transforming knowledge graph information into binary-valued embedding vectors and using the binary-valued embedding vectors to efficiently provide accurate answers during a question answer session.

Information handling system 100 stores knowledge graph 305 in data store 300. Knowledge graph 305 includes nodes (A, B, C, D, . . . ) and edges connecting the various nodes. Binary-valued embeddings generation module 320 performs a series of steps to transform knowledge graph 305's nodes and edges into binary-valued embedding vectors 330. Steps include indexing each node a value V; initializing a D-dimensional vector for each node to form a matrix E of size V×D; initializing the matrix E with uniform random values; optimizing the matrix and generating embedding approximation values for each node; and transforming the embedding approximation values into binary-valued embedding vectors. Binary-valued embedding vectors 330 are stored in embeddings store 350 (see FIG. 4 and corresponding text for further details).

Information handling system 100 (e.g., a question answer system) receives query 360 that requests nodes similar to "A." For example, query 360 may ask "Which Chinese organization is most closely related to Nabisco?" or "Which nodes best complete the analogy Obama:Joe Biden::Baghdadi:___?" Node lookup module 370 locates an entry for node A in embeddings store 350 and retrieves node A's corresponding binary-valued embedding vector 375 (from binary-valued embedding vectors 330). Next, closest neighbor vector generator 380 flips each bit of binary-valued embedding vector 375 individually while keeping the other bits fixed to generate binary-valued embedding vector 375's closest neighbors, which equates to one distance away from node A in each direction. Closest neighbors vectors 385 shows vectors <0,0,1,0> (first bit flipped), <1,1,1,0> (second bit flipped), <1,0,0,0> (third bit flipped), and <1,0,1,1> (fourth bit flipped) (see FIG. 6 and corresponding text for further details).

Comparator 390 searches through embeddings store 350 to locate entries that include binary-valued embedding vectors that match one of closest neighbors vectors 385. Comparator 390 then identifies the node corresponding to the matching vector and provides results 395 accordingly. As can be seen from binary-valued embedding vectors 330 produced by binary-valued embeddings generation module 320, node "C" has a binary-valued embedding vector of <1,1,1,0>, which matches one of closest neighbors vectors 385 (see FIG. 6 and corresponding text for further details).

Figure 4:
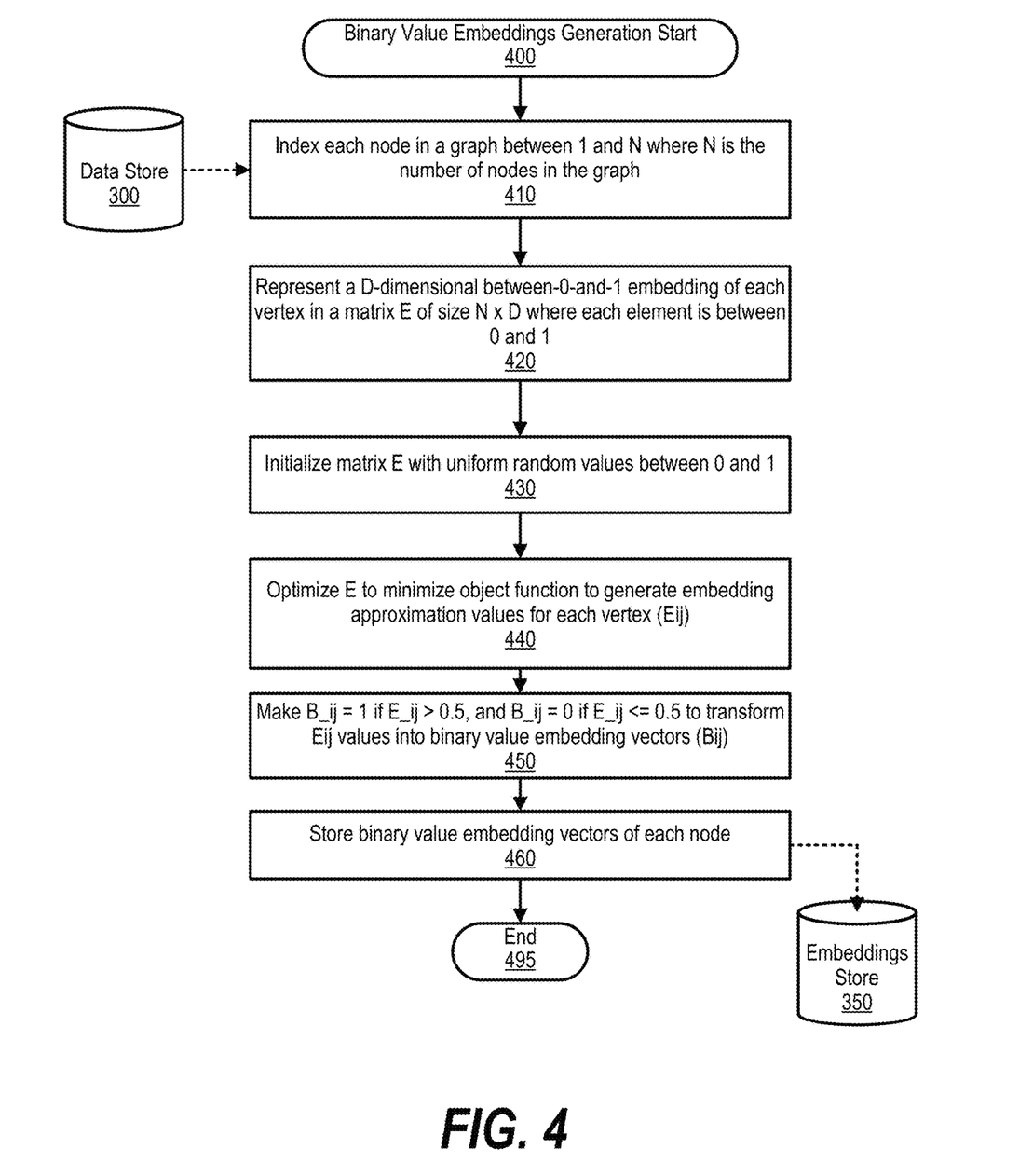
FIG. 4 is a flowchart depicting an example of steps taken to generate binary value embedding vectors for nodes in a knowledge graph.

FIG. 4 is a flowchart depicting an example of steps taken to generate binary value embedding vectors for nodes in a knowledge graph. FIG. 4 processing commences at 400 whereupon, at step 410, the process retrieves knowledge graph information (e.g., knowledge graph 305) and assigns an index to each node in the knowledge graph between 1 and N, where N is the number of nodes in the graph.

At step 420, the process initializes embedding elements in D-dimensionality (number of feature sets) between 0 and 1 for each node in a matrix E, resulting in a matrix of size N×D. For example, if knowledge graph 305 includes 500 nodes and 30 dimensions, the process initiates 30 embedding elements into each node to produce a matrix of size 500×30. At step 430, the process initializes the matrix E with uniform random values between 0 and 1.

At step 440, the process optimizes the matrix E to minimize an object function and generates embedding approximation values for each node (Eij). For example, the process may use an objective function such as:

$$L_{mean}(G) = \sum_{(i,j) \in G} -\log \frac{e^{ad_H(p_i, p_j)+b}}{e^{ad_H(p_i,p_j)+b} + p_K(j|i)} - \log \frac{p_K(K_{ij}|i)}{e^{ad_H(p_i,p_K)+b} + p_K(K_{ij}|i)},$$

In the above formula, p_i and p_j refer to the embedding feature vectors for nodes i and j. The function d_H refers to a continuous Hamming distance between two vectors (d_h(x,y)=\sum_i x_i*(1-y_i)+(1-x_i). P_K(j|i) is a constant 1/number_of_nodes_in_graph, and a and b are learned parameters. To arrive at the above objective, the process assumes that the entries of E will be turned into a matrix B of binary 0-1 numbers in the following random manner: B_ij is set to 1 with probability E_ij, and is set to 0 with probability 1−E_ij. To learn what the "optimal" choice of E is, the process trains a model that predicts the probability of an edge between any two nodes i and j given the Hamming distance between their binary embedding vectors B_i and B_j: d_H(B_i, B_j). The process applies a softmax classifier to this task, leading to a log loss objective with B_i and B_j in place of p_i and p_j. As this objective is a function of the randomly generated matrix B, the process replaces it with its mean over all the different matrices B that could be drawn according to the procedure outlined above. A simple and accurate (for large enough dimensionality D) approximation to this is to recognize that the quantities d_H(B_i,B_j) are very concentrated, and as such may be replaced by their mean values d_H(p_i, p_j), leading directly to the objective above.

For cases where the dimensionality D is smaller, the above approximation may be insufficiently accurate. In these cases, instead of approximating d_H(B_i,B_j) by its mean value d_H(p_i,p_j), the process performs approximation by a Gaussian distribution with mean mu_ij and variance sigma_ij, where mu_ij=d_H(p_i,p_j), and sigma_ij=sum_{k=1}^{K=D}(p_ik*(1−p_jk)+(1−p_ik)*p_jk). The approximate objective can then be defined via numerical integration as:

$$E[f(\mu_{ij} + \sigma_{ij}Z)]_Z = \int_0^1 f(\mu_{ij} + \sigma_{ij}z) d\Phi_z \approx \frac{1}{2N} \sum_{n=1}^{N} f\left(\mu_{ij} + \sigma_{ij}\Phi_z^{-1}\left(\frac{2n-1}{2N}\right)\right),$$

$$\text{where } f(x) = \log\left(\frac{e^{ax+b}}{e^{ax+b}+C}\right) + \log\left(\frac{C}{e^{ax+b}+C}\right)$$

with C=1/number_nodes and with Phi_z denoting the Gaussian cumulative distribution function.

At step 450, the process transforms the embedding approximation values Eij into binary value embedding elements/vectors (Bij) by changing Bij=1 when Eij>0.5, and changing Bij=0 when Eij<=0.5. At step 480, the process stores the binary value embedding vectors of each node in embeddings store 350. FIG. 4 processing thereafter ends at 495.

Figure 5:
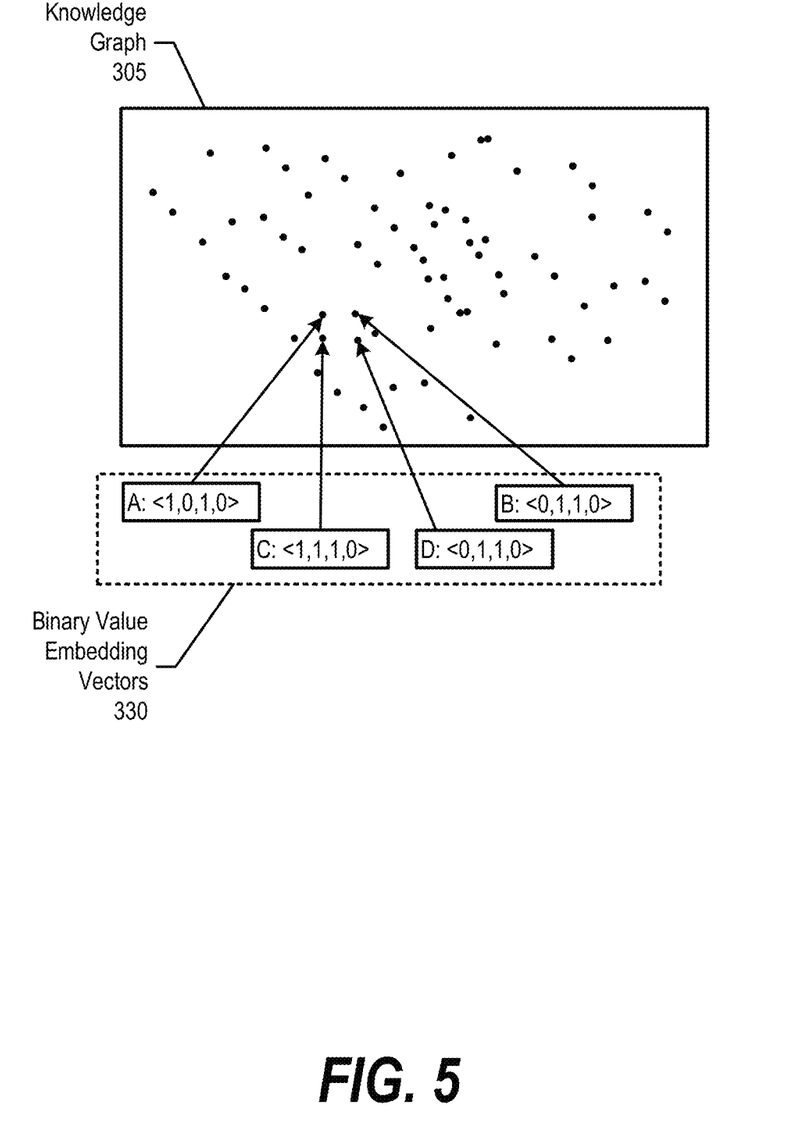
FIG. 5 is a diagram depicting an example of a knowledge graph and binary-valued embedding vectors generated through steps discussed herein.

FIG. 5 is a diagram depicting an example of a knowledge graph and binary-valued embedding vectors generated through steps shown in FIG. 4. Knowledge graph 305 may include hundreds or thousands of nodes, each representing an entity. As those skilled in the art can appreciate, the nodes are positioned based on their feature sets relative to the other nodes. For example, nodes corresponding to a specific subject (automobiles, politics, etc.) may be in close spatial proximity to each other.

Binary-valued embeddings generation module 320 creates binary-valued embedding vectors 330 for each node within knowledge graph 305 using the steps discussed above. In turn, information handling system 100 can use binary-valued embedding vectors 330 to quickly provide answers to queries in real-time without taxing processing resources to perform complex algorithms (see FIG. 6 and corresponding text for further details). As those skilled in the art can appreciate, binary-valued embedding vectors 330 may be stored in a matrix, in a database, back into knowledge graph 305, or any other means to access during query processing.

Figure 6:
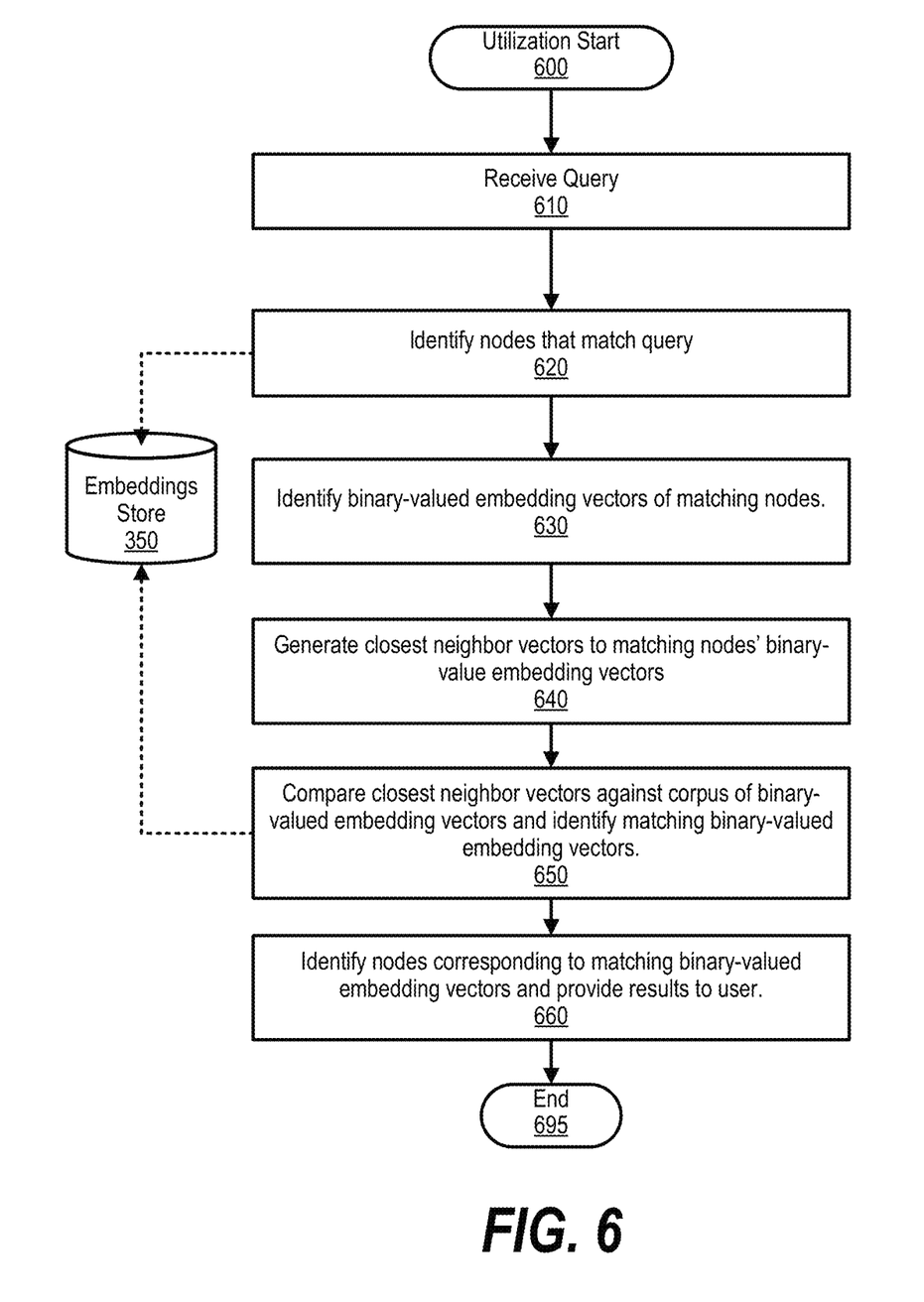
FIG. 6 is a flowchart depicting an example of steps taken to receive a query and efficiently provide accurate information using pre-generated binary-valued embedding vectors.

FIG. 6 is a flowchart depicting an example of steps taken to receive a query and efficiently provide accurate results using pre-generated binary-valued embedding vectors. FIG. 6 processing commences at 600 whereupon, at step 610, the process receives a query with a corresponding element, such as query 360's similarity to "A" shown in FIG. 3. At step 620, the process identifies nodes in embeddings store 350 that correspond to the query element using techniques such as mapping the element to the knowledge graph and using brute force Hamming distance computations between the query embedding and the node embeddings to find the nearest neighbors, direct lookup of nearby nodes to the query if the embedding vectors are used as memory addresses (as in semantic hashing), etc.

At step 630, the process identifies binary-valued embedding vectors of the matching nodes. Referring to FIG. 3, node lookup module 370 identifies binary value embedding vector 375 to correspond with element "A" from query 360.

Next, at step 640, the process generates closest neighbor vectors based on the matching entities' binary value embeddings vectors by flipping each bit, on an individual basis, of the identified binary-valued embedding vectors. Referring to FIG. 3, closest neighbor vector generator 380 generates vectors 385 from vector 375 by changing one bit at a time for each of the four different elements in binary-valued embedding vector 375.

At step 650, the process compares the closest neighbor vectors against the corpus of binary-valued embedding vectors stored in embeddings store 350 and identifies those binary-valued embedding vectors that match the generated closest neighbor vectors. At step 660, the process identifies the nodes corresponding to the matched binary-valued embedding vectors and provides the node results accordingly. Referring to FIG. 3, comparator 390 determines that node "C" has a binary-valued embedding vector that matches one of vectors 385, which is "<1,1,1,0>" from binary-valued embedding vectors 330. FIG. 6 processing thereafter ends at 695.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:

transforming a plurality of embedding approximation values into a plurality of binary valued embedding vectors, wherein the plurality of embedding approximation values correspond to a plurality of nodes in a knowledge graph;

determining that a first one of the plurality of nodes matches a query, wherein the first node corresponds to a first one of the plurality of binary valued embedding vectors;

creating a plurality of second binary valued embedding vectors from the first binary valued embedding vector, wherein each one of the plurality of second binary valued embedding vectors comprises a single bit that is different from the first binary valued embedding vector, and wherein each one of the plurality of second binary valued embedding vectors is different from each other;

identifying a second one of the plurality of nodes that corresponds to one of the plurality of second binary valued embedding vectors; and providing a result to the query based on the second node.

2. The method of claim 1 wherein, prior to the transforming of the plurality of embedding approximation values, the method further comprises:

initializing a plurality of embedding elements having a number of dimensions, wherein the number of dimensions is based on an amount of feature sets corresponding to each of the plurality of nodes;

generating a matrix based on an amount of the plurality of nodes and the number of dimensions; and optimizing the matrix to minimize an objective function, wherein the optimization produces the plurality of embedding approximation values.

3. The method of claim 1 wherein the transforming further comprises:

assigning a binary value of 0 to each of the plurality of embedding approximation values that is less than 0.5; and assigning a binary value of 1 to each of the plurality of embedding approximation values that is greater than or equal to 0.5.

4. The method of claim 1 wherein the plurality of nodes are sparsely distributed in the knowledge graph.

5. The method of claim 1 wherein the determination that one of the plurality of nodes matches the query further comprises:
   mapping an element in the query into the knowledge graph; and
   identifying a closest neighbor to the mapped element, wherein the closest neighbor is the matched node.

* * * * *